(12) United States Patent
Ise

(10) Patent No.: US 10,922,787 B2
(45) Date of Patent: Feb. 16, 2021

(54) IMAGING APPARATUS AND METHOD FOR CONTROLLING IMAGING APPARATUS

(71) Applicant: CANON KABUSHIKI KAISHA, Tokyo (JP)

(72) Inventor: Yasuaki Ise, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 74 days.

(21) Appl. No.: 16/272,751

(22) Filed: Feb. 11, 2019

(65) Prior Publication Data
US 2019/0251662 A1 Aug. 15, 2019

(30) Foreign Application Priority Data
Feb. 15, 2018 (JP) .............................. JP2018-025185

(51) Int. Cl.
*G06T 3/40* (2006.01)
*G06T 3/00* (2006.01)

(52) U.S. Cl.
CPC .......... *G06T 3/4038* (2013.01); *G06T 3/0018* (2013.01); *G06T 3/4007* (2013.01)

(58) Field of Classification Search
CPC ........ B60R 2300/105; B60R 2300/303; G06T 3/4038; G06T 2207/20212
See application file for complete search history.

(56) References Cited

U.S. PATENT DOCUMENTS

| | | | | |
|---|---|---|---|---|
| 7,006,707 | B2* | 2/2006 | Peterson | G06T 3/005 382/285 |
| 7,095,905 | B1* | 8/2006 | Peterson | G06T 3/4038 348/36 |
| 7,590,335 | B2* | 9/2009 | Kobayashi | H04N 5/23232 348/333.03 |
| 7,697,055 | B2* | 4/2010 | Imoto | B60R 1/00 348/335 |
| 8,379,054 | B2* | 2/2013 | Katayama | G06T 3/4038 345/629 |
| 8,401,318 | B2* | 3/2013 | Tetsukawa | H04N 19/56 382/236 |

(Continued)

FOREIGN PATENT DOCUMENTS

| | | |
|---|---|---|
| CN | 104346788 A | 2/2015 |
| CN | 105472272 A | 4/2016 |
| JP | 2006-229789 A | 8/2006 |

*Primary Examiner* — Yosef Kassa
(74) *Attorney, Agent, or Firm* — Canon U.S.A., Inc. IP Division

(57) ABSTRACT

An imaging apparatus that starts connecting processing at a synthesizing position in an early stage is provided. The imaging apparatus includes: a first imaging element that images a first imaging range, a second imaging element that images a second imaging range of which one part overlaps with the first imaging range, and a synthesizing unit that synthesizes an image corresponding to an imaging range wider than the first imaging range or the second imaging range, based on pixel data groups output by the first imaging element and the second imaging element, wherein the first imaging element and the second imaging element output pixel data corresponding to a position at which the first imaging range and the second imaging range overlap each other, to a synthesizing unit prior to other pixel data.

9 Claims, 10 Drawing Sheets

(56) References Cited

U.S. PATENT DOCUMENTS

| | | | |
|---|---|---|---|
| 8,674,301 B2 * | 3/2014 | Takagi | G02B 21/0004 |
| | | | 250/306 |
| 8,818,046 B2 * | 8/2014 | Kurata | H04N 5/145 |
| | | | 382/107 |
| 8,953,898 B2 * | 2/2015 | Fukuhara | H04N 19/64 |
| | | | 382/240 |
| 9,618,746 B2 * | 4/2017 | Browne | G02B 27/017 |
| 2012/0257005 A1 | 10/2012 | Browne | |
| 2017/0006220 A1 | 1/2017 | Adsumilli | |

* cited by examiner

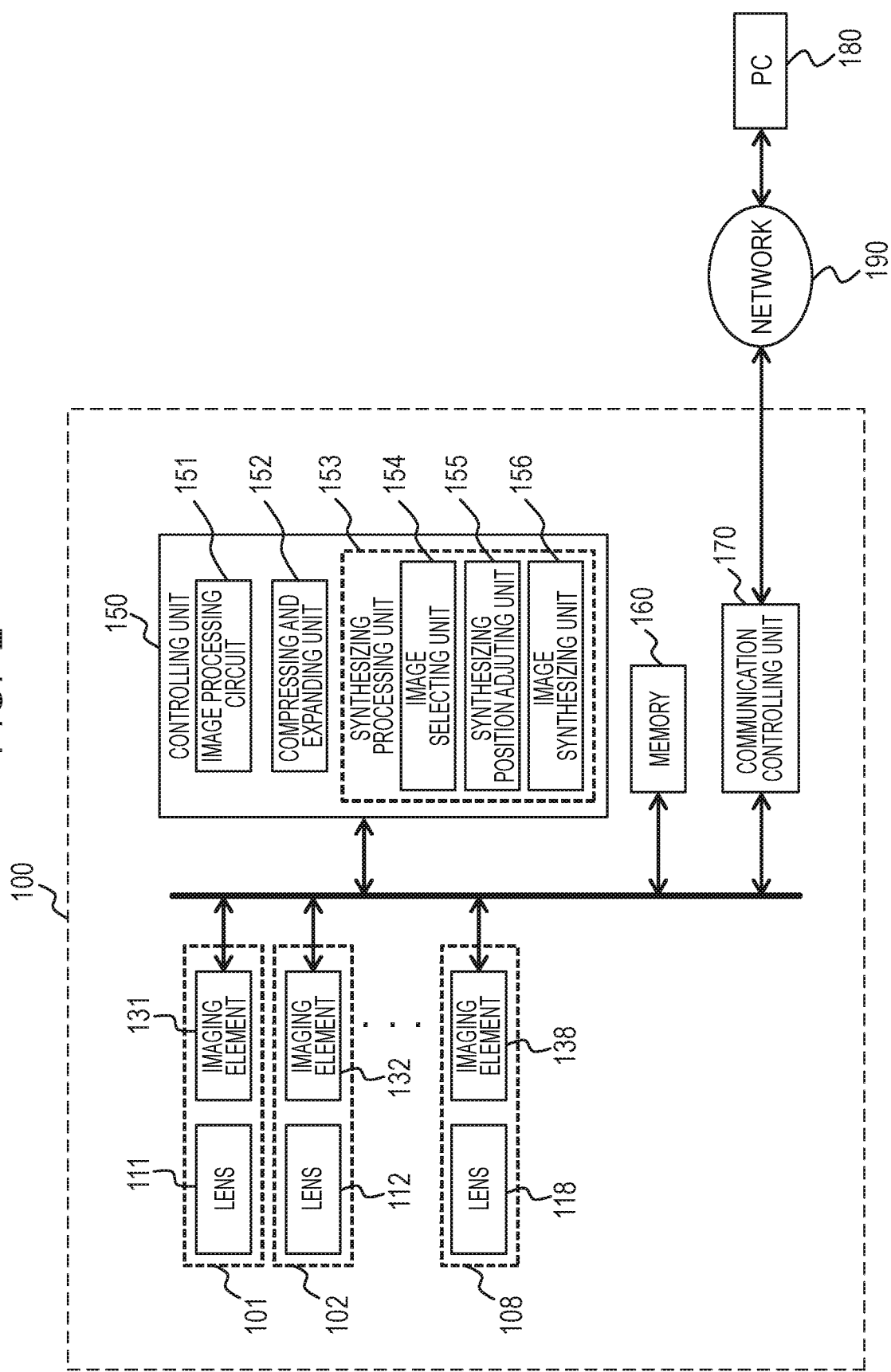

FIG. 3
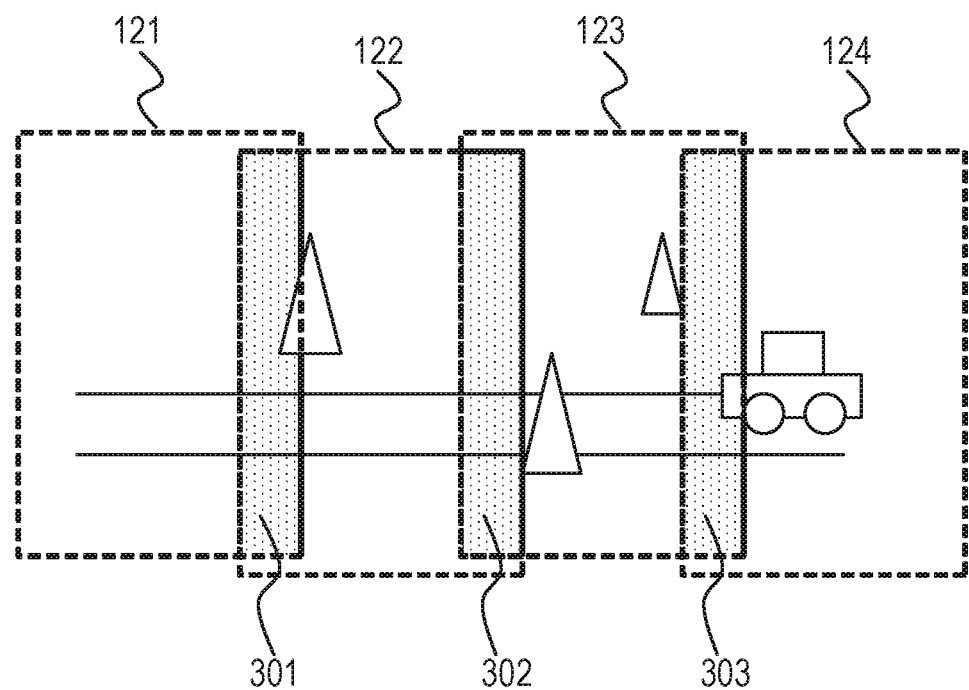
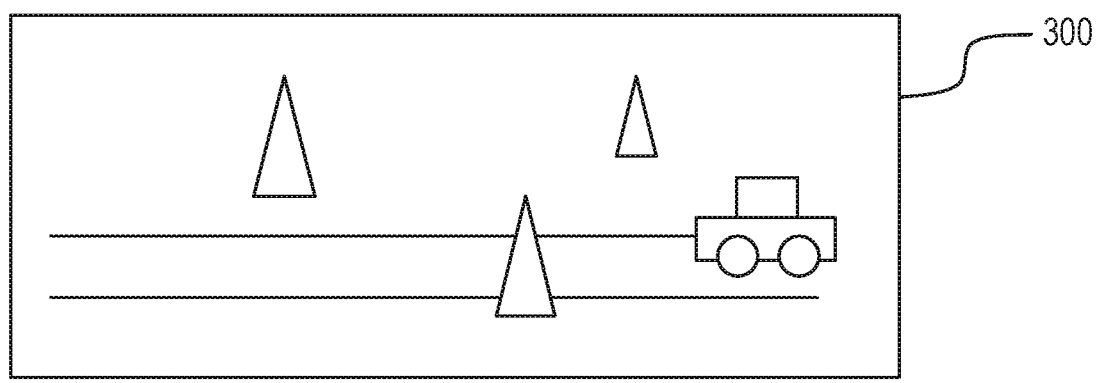

IMAGING APPARATUS AND METHOD FOR CONTROLLING IMAGING APPARATUS

BACKGROUND

Field of the Disclosure

The present disclosure relates to an imaging apparatus, and a method for controlling the imaging apparatus.

Description of the Related Art

Omnidirectional cameras are known to have a field of view on a hemisphere due to a fish-eye lens, as an imaging apparatus which can photograph wide-field images. On the other hand, an imaging apparatus is also known to arrange a plurality of lenses each having a narrow field of view and imaging elements, and synthesizes obtained images to thereby achieve a wide field of view. The latter can generate a wide-angle image having a higher resolution than an imaging apparatus formed of a single imaging element and provided with the fish-eye lens or the like. For example, Japanese Patent Application Laid-Open No. 2006-229789 discloses a camera monitoring system that synthesizes images photographed by a plurality of cameras and displays a panoramic image. When the imaging apparatus synthesizes a plurality of photographed images to generate a wide-angle image, it is necessary to subject each of the photographed images to connecting processing (deformation processing such as position alignment and distortion correction) between photographed images; and accordingly the processing load becomes very large. In addition, delays due to arithmetic processing occur.

SUMMARY

In view of such a situation, the present disclosure is directed at providing an imaging apparatus that can start the connecting processing in a synthesizing position in an early stage, and a method for controlling the imaging apparatus.

An imaging apparatus of the present disclosure includes: a first imaging element that images a first imaging range; a second imaging element that images a second imaging range of which one part overlaps with the first imaging range; and a synthesizing unit that synthesizes an image corresponding to an imaging range wider than the first imaging range or the second imaging range, based on pixel data groups output by the first imaging element and the second imaging element, wherein the first imaging element and the second imaging element output pixel data corresponding to a position at which the first imaging range and the second imaging range overlap with each other, to the synthesizing unit prior to other pixel data.

According to the present invention, the imaging apparatus can start the connecting processing at the synthesizing position in an early stage.

Further features of the present invention will become apparent from the following description of exemplary embodiments with reference to the attached drawings.

BRIEF DESCRIPTION OF THE DRAWINGS

FIG. 2 illustrates a block diagram for describing a configuration of the imaging apparatus.

FIG. 3 illustrates a schematic view for describing a photographed image.

DESCRIPTION OF THE EMBODIMENTS

Exemplary embodiments of the present invention will now be described in detail in accordance with the accompanying drawings.

First Embodiment

Figure 1A:
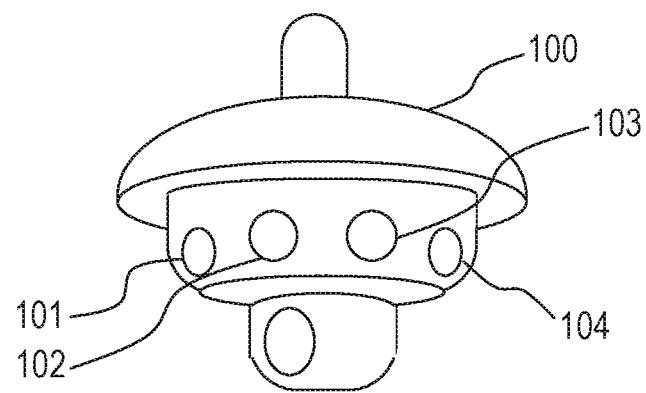
FIGS. 1A and 1B illustrate schematic views for describing an outline of an imaging apparatus.
Figure 1B:
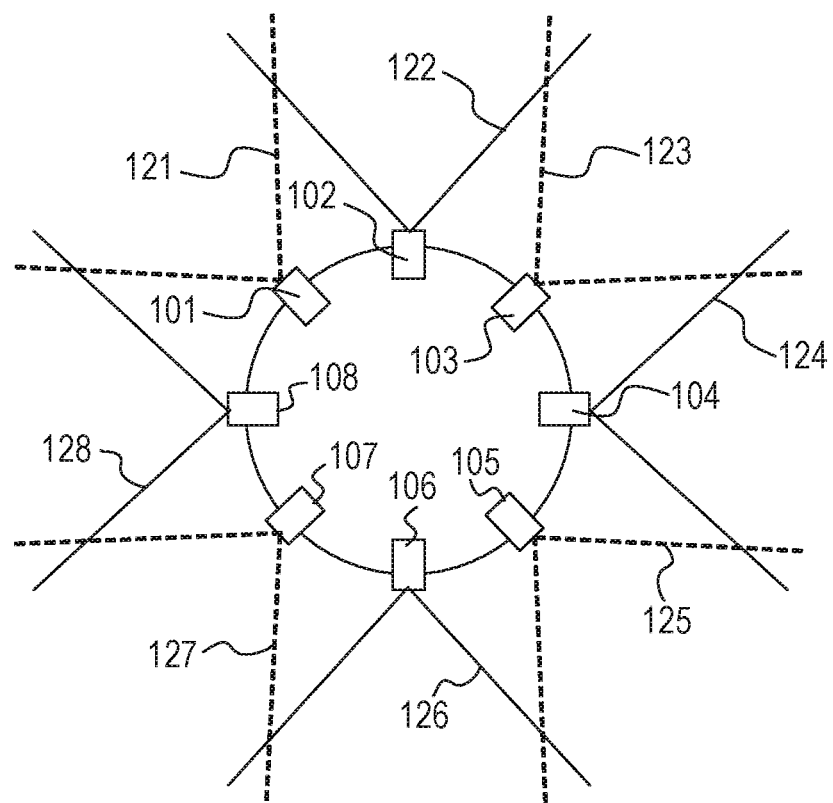

FIG. 1A illustrates a view of an appearance of an imaging apparatus 100 according to the first embodiment of the present invention; and FIG. 1B illustrates a plan view illustrating an arrangement example of imaging units 101 to 108 in the imaging apparatus 100. The imaging apparatus 100 has, for example, eight imaging units 101 to 108. The number of imaging units is not limited to eight. Each of the imaging units 101 to 108 is an imaging unit having a lens optical system and an imaging element. The imaging units 101 to 108 are arranged radially from the center of the imaging apparatus 100, and arranged so as to enable 360° photographing. Photographing angles of view 121 to 128 are photographing angles of view of the imaging units 101 to 108, respectively. For example, the imaging units 101 to 108 are arranged so that parts of the respective photographing angles of view overlap with the other, like the photographing angle of view 121 of the imaging unit 101 and the photographing angle of view 122 of the imaging unit 102 adjacent to the imaging unit 101. The imaging apparatus 100 synthesizes images photographed by the respective imaging units 101 to 108 to generate a wide-angle moving image having a horizontal view of 360° at maximum. In the following, the imaging apparatus 100 will be described which generates a wide-angle moving image by synthesizing moving images imaged by the plurality of imaging units 101 to 108.

FIG. 2 illustrates a view illustrating a configuration example of the imaging apparatus 100. The imaging apparatus 100 includes a plurality of imaging units 101 to 108, a controlling unit 150, a memory 160 and a communication controlling unit 170. The controlling unit 150 includes an image processing circuit 151, a compressing and expanding unit 152 and a synthesizing processing unit 153. The synthesizing processing unit 153 includes an image selecting unit 154, a synthesizing position adjusting unit 155 and an image synthesizing unit 156.

The controlling unit 150 is, for example, a CPU or an MPU, and controls the whole imaging apparatus 100. The memory 160 has a non-volatile memory and a RAM. The non-volatile memory stores a program which the controlling unit 150 executes, and various parameters. The RAM is used as a work area of the controlling unit 150, and is also used as a storage area to be used in image processing.

The imaging units 101 to 108 have imaging elements 131 to 138 and lens optical systems 111 to 118, respectively; and image moving images in predetermined imaging ranges, and output pixel data groups. Each of the imaging elements 131 to 138 is formed of a CMOS sensor or the like, converts an optical image which has been imaged on an imaging plane into electric signals, and outputs obtained electric signals to the controlling unit 150 as a moving image.

The controlling unit 150 is connected to the imaging units 101 to 108, and subjects the moving images imaged by the imaging units 101 to 108 to various image processing. The image processing circuit 151 subjects the moving images of the imaging units 101 to 108 to image processing such as pixel interpolation processing and color conversion processing, and stores the processed moving images in the memory 160. The image processing unit 153 sequentially synthesizes images in each frame of the moving image in each of the imaging units 101 to 108, which has been stored in the memory 160, thereby generates a wide-angle image, and stores the generated wide-angle image in the memory 160. Details of the image processing unit 153 will be described later. The compressing and expanding unit 152 subjects the wide-angle image stored in the memory 160 to compress moving image processing such as H.264, and records the compressed moving image, in a recording medium such as a non-volatile memory in the memory 160 or a memory card.

The communication controlling unit 170 is a network processing circuit, converts the wide-angle image generated by the controlling unit 150 into a communication signal compliant with the communication protocol, and transmits the obtained communication signal to a PC 180 via a network 190. The PC 180 is a general-purpose computer such as a personal computer, and is connected to the imaging apparatus 100 via the network 190. The PC 180 receives the wide-angle image in the imaging apparatus 100, and transmits control information for controlling the imaging apparatus 100.

A method for controlling the imaging apparatus 100 will be described below with reference to FIGS. 3 and 4. FIG. 3 illustrates a view illustrating a relationship between an object and the photographing angles of view 121 to 124 of the respective imaging units 101 to 104 in the imaging apparatus 100 in FIG. 1B. The photographing angles of view 121 to 124 are the photographing angles of view corresponding to the imaging units 101 to 104 in FIG. 1B. The imaging units 101 to 108 are arranged so that parts of the photographing angles of view 121 to 128 overlap each other.

When the moving images of the plurality of photographing angles of view 121 to 124 are combined, image regions (image overlapping regions) 301 to 303 exist, in which the photographing angles of view 121 to 124 overlap each other, because parallax exists between adjacent imaging units in the imaging units 101 to 104, depending on the arrangement of the imaging units 101 to 104. In the image overlapping regions 301 to 303, the synthesizing position adjusting unit 155 adjusts the synthesizing position of the image to be synthesized in each frame of the moving image. The synthesizing position is adjusted so that the same object images in the image overlapping regions 301 to 303 overlap each other. The image synthesizing unit 156 synthesizes the moving images of each of the imaging units 101 to 108 to obtain a synthesized image 300. The synthesized image 300 is an image corresponding to an imaging range wider than the imaging range of each of the imaging units 101 to 108.

Here, the moving images of the four photographing angles of view 121 to 124 are synthesized, but the number of synthesizing sheets is not limited to four.

Figure 4:
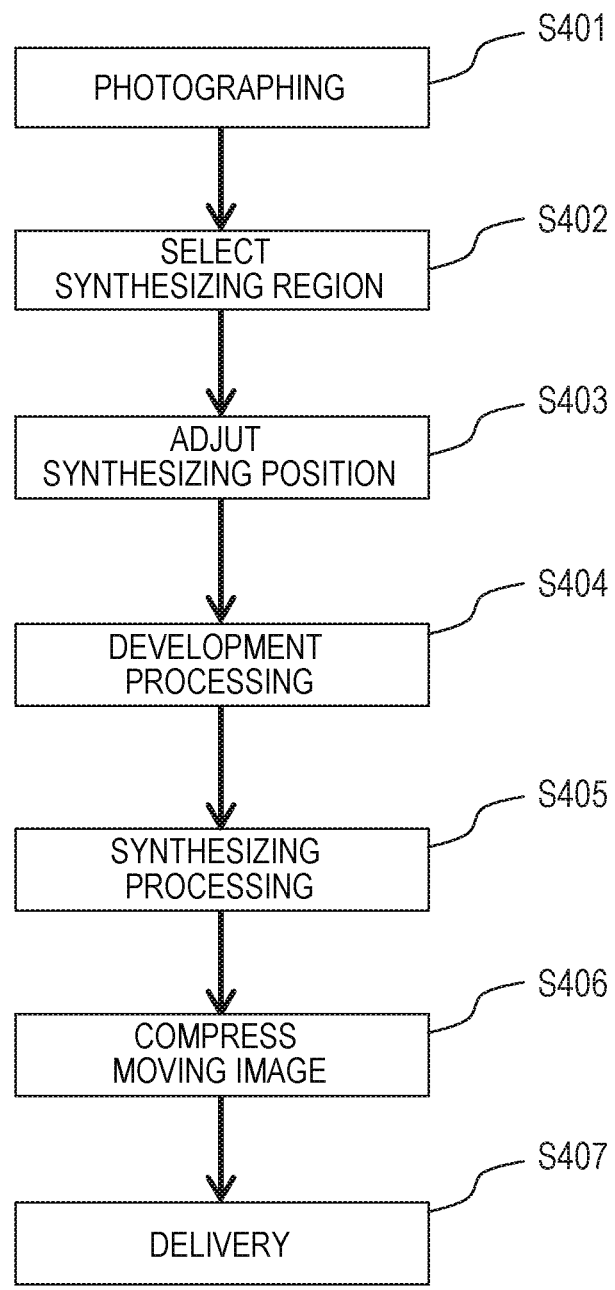
FIG. 4 illustrates a flowchart illustrating synthesizing processing of the image.

FIG. 4 illustrates a flowchart illustrating synthesizing processing of images. In step S401, the controlling unit 150 outputs a photographing instruction to the imaging units 101 to 108. Each of the imaging units 101 to 108 images a moving image of a predetermined imaging range, based on the photographing instruction from the controlling unit 150, and outputs the pixel data group. The controlling unit 150 stores the moving images imaged by the imaging units 101 to 108, in the RAM of the memory 160.

Next, in step S402, the image selecting unit 154 selects a partial image corresponding to the image overlapping regions 301 to 303 and the like from the moving images stored in the memory 160, and outputs the selected partial image to the synthesizing position adjusting unit 155. The image selecting unit 154 determines whether or not the controlling unit 150 has inputted a partial image of a size which has been specified in advance, from the imaging units 101 to 108. For example, when the image overlapping regions 301 to 303 and the like are partial pixels corresponding to 100 lines of the imaging units 101 to 108, the controlling unit 150 receives the partial pixels corresponding to 100 lines from the imaging units 101 to 108, and stores the partial pixels in the memory 160. The image selecting unit 154, when having detected that the controlling unit 150 has saved the partial image in the memory 160, outputs the partial image corresponding to 100 lines stored in the memory 160, to the synthesizing position adjusting unit 155. The controlling unit 150 may store the sizes of the image overlapping regions 301 to 303 and the like, in the memory 160 as parameters, when the imaging apparatus 100 is installed. When the imaging apparatus 100 is installed, the controlling unit 150 sets the photographing angles of view 121 to 128 according to the object distance, and thereby can set the image overlapping regions 301 to 303 and the like. In addition, the image overlapping regions 301 to 303 and the like may be set so as to be changed appropriately according to the object.

Next, in step S403, the synthesizing position adjusting unit 155 adjusts the synthesizing position of each frame of the moving images imaged by the imaging units 101 to 108. The synthesizing position adjusting unit 155 detects the same object in each of the partial images of two images to be synthesized in the respective image overlapping regions 301 and the like, and calculates a position correction parameter for synthesizing so that the positions of the same object coincide which has been detected in the images before being synthesized. The position correction parameter includes parameters for performing deformation processing such as enlargement, reduction and distortion correction of each image, and parameters for performing image clipping from the image after the correction processing, and the like. The same object can be detected with the use of existing technologies. For example, the synthesizing position adjusting unit 155 performs edge detection by background subtraction or the like to extract a contour shape of the object. Alternatively, the synthesizing position adjusting unit 155 can extract a motion vector and determine whether or not the object is the same by using color pixel information together.

Next, in step S404, the image processing circuit 151 receives moving images from the imaging units 101 to 108, and subjects the moving images to image processing such as pixel interpolation processing and color conversion processing, and various correction processing such as pixel defect correction and lens correction. The image processing circuit 151 subjects the moving images to: detection processing for adjusting black level, focus, exposure and the like; demosaic processing; white balance processing; gamma correction processing; edge emphasis processing; noise suppression processing; and the like, and stores the resultant moving images in the memory 160.

In step S403, the synthesizing position can be adjusted with the use only of the partial images such as the image overlapping regions 301 to 303, and accordingly the processing in step S404 can also be processed in parallel with the processing in steps S402 and S403.

Next, in step S405, the image synthesizing unit 156 performs synthesizing processing for the moving images of the imaging units 101 to 108. Firstly, the image synthesizing unit 156 performs correction processing for the position of the moving images of the imaging units 101 to 108, based on the position correction parameter calculated by the synthesizing position adjusting unit 155, and performs the synthesis on each frame. After that, the image synthesizing unit 156 subjects the synthesized image to appropriate scaling processing, clips the resultant image to a designated size of angle of view, and generates a wide-angle image.

Next, in step S406, the compressing and expanding unit 152 compresses the wide-angle image, and outputs the compressed moving image to the communication controlling unit 170.

Next, in step S407, the communication controlling unit 170 delivers the compressed moving image to the PC 180 via the network 190, based on a predetermined protocol.

Figure 5A:
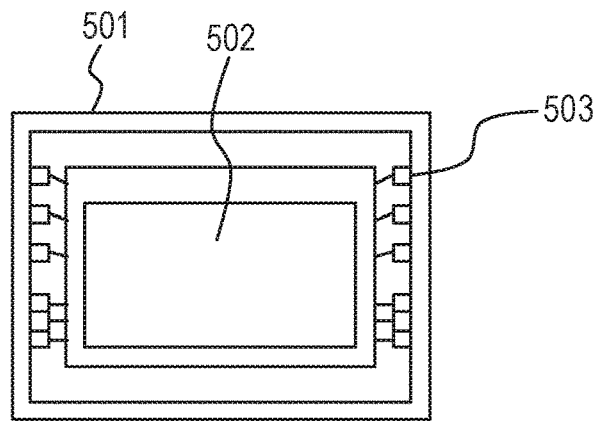
FIGS. 5A, 5B and 5C illustrate schematic views for describing the operation of the imaging element.
Figure 5B:
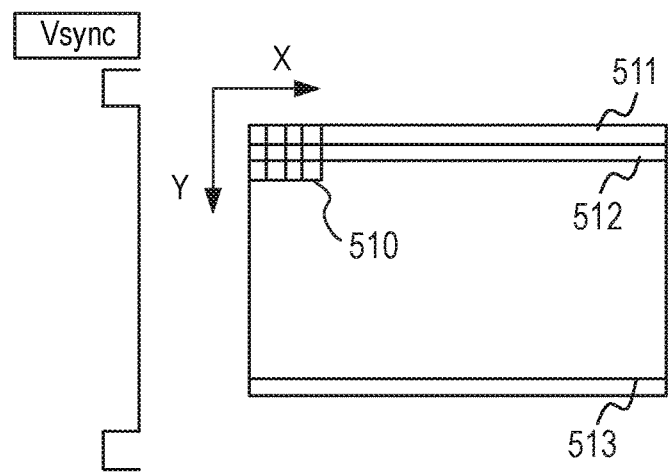
Figure 5C:
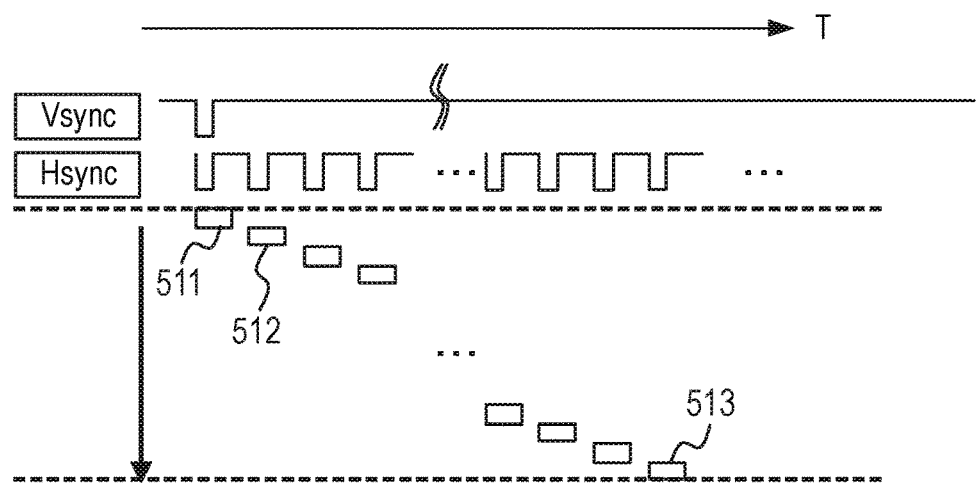

Next, the arrangement of the imaging elements 131 to 138 of the imaging units 101 to 108 of the present embodiment will be described below with reference to FIGS. 5A, 5B and 5C and FIGS. 6A and 6B. FIGS. 5A, 5B and 5C illustrate diagrams for describing the operations of each of imaging elements 131 to 138 according to the present embodiment.

FIG. 5A illustrates a view illustrating an appearance of an imaging element 501. The imaging element 501 corresponds to each of the imaging elements 131 to 138 in FIG. 2, and has a pixel portion 502 and terminals 503. The pixel portion 502 has a plurality of pixels each of which performs photoelectric conversion. The terminal 503 is a terminal for connecting the pixel portion 502 to a peripheral circuit. The imaging element has a photoelectric conversion element, an electrode layer such as a readout electrode, and further a color filter, an on-chip lens or the like formed on the front surface side of a semiconductor substrate, and makes light enter from this surface side to perform imaging. For example, an amplification type solid imaging element is a type of X-Y address type solid state imaging element in which pixels are arranged in a matrix form, and constitutes a pixel by using an active element (MOS transistor) having an MOS structure or the like, in order to impart an amplifying function to the pixel itself. In addition, the amplification type solid imaging element amplifies a signal charge accumulated in the photodiode which is the photoelectric conversion element, by the active element, and reads out the resultant signal charge as an image.

In this X-Y address type solid imaging element, for example, a large number of pixel transistors are arranged in a two-dimensional matrix form to constitute a pixel portion 502. The X-Y address type solid state imaging element starts to accumulate signal charges corresponding to incident light in each line (line) or each pixel, and reads out a signal of electric current or voltage based on the accumulated signal charge, sequentially from each pixel according to address designation. Here, as an example of the address designation, the X-Y address type solid imaging element uses a column readout method (column parallel output method) of simultaneously accessing one line and reading out a pixel signal from the pixel portion 502 on a line-by-line basis.

The imaging element reads out pixel data of each horizontal line in order from one end of the pixel portion 502, in synchronization with the horizontal synchronizing signal, converts the pixel data into image data of a digital value by an analog-digital converter, and outputs the resultant image data.

FIG. 5B illustrates a view illustrating the array of the pixels 510 in the pixel portion 502 of FIG. 5A; and FIG. 5C is a time chart illustrating the readout timing of the pixel data of the pixel portion 502. The pixel portion 502 has a plurality of pixels arranged in a two-dimensional matrix. FIG. 5C illustrates a relationship between the horizontal synchronizing signal Hsync and the readout timing for each of the pixel lines 511 to 513. The pixel portion 502 has a plurality of pixel lines 511 to 513. For example, the imaging element 501 sequentially reads out pixel data in each pixel line from the pixel line 511 to the pixel line 513 (from top to bottom). In this way, the order of reading out the pixel data within the photographing angle of view results in changing, according to the arrangement of the imaging element 501.

Figure 6A:
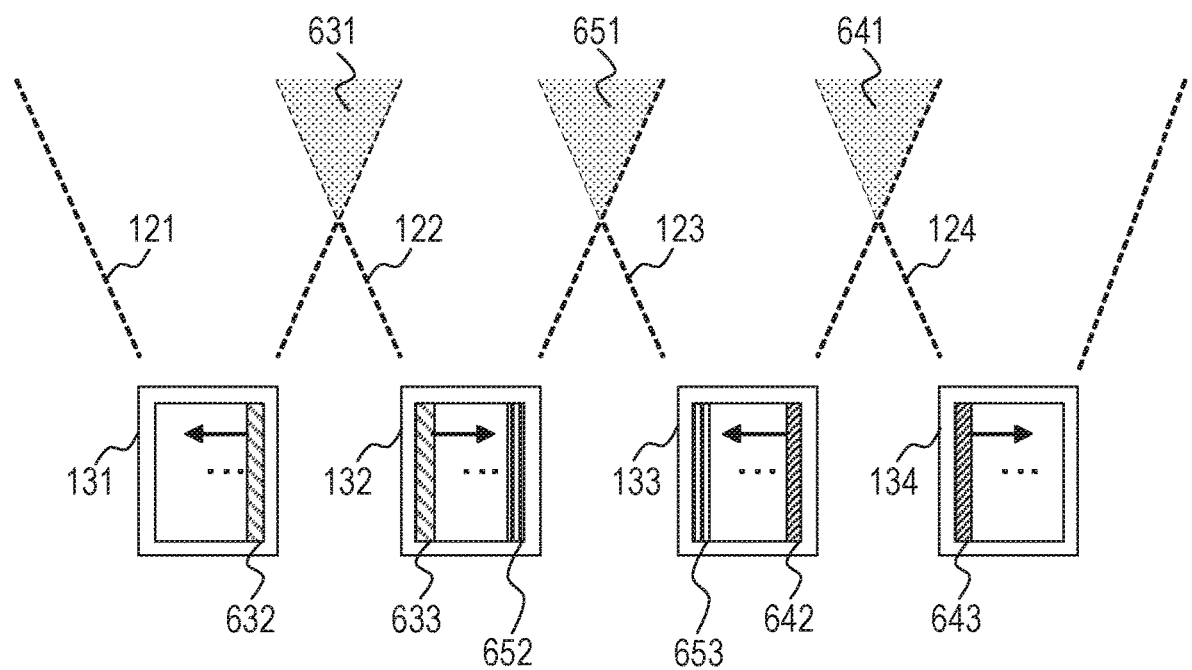
FIGS. 6A and 6B illustrate schematic views illustrating an arrangement example of imaging elements.
Figure 6B:
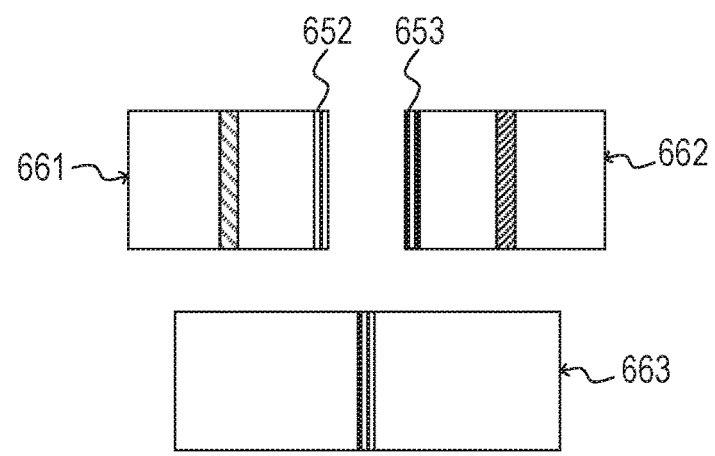

FIGS. 6A and 6B illustrate views illustrating a relationship between the arrangement of the imaging elements 131 to 134 according to the present embodiment and images to be synthesized. Here, the processing in the case where the images of the four imaging elements 131 to 134 are synthesized will be described below.

FIG. 6A illustrates a view illustrating an arrangement example of the imaging elements 131 to 134. The imaging elements 131 to 134 are arranged adjacent to each other, and correspond to the imaging elements 131 to 134 of the imaging units 101 to 104 in FIG. 2. Arrows written in the imaging elements 131 to 134 indicate a readout direction of pixel data in the imaging elements 131 to 134, respectively. The imaging element 131 reads out pixels on a line-by-line basis in the left direction. The imaging element 132 reads out pixels on a line-by-line basis in the right direction which is a direction opposite to the readout direction in the imaging element 131. The imaging element 133 reads out pixels on a line-by-line basis in the left direction. The imaging element 134 reads out pixels on a line-by-line basis in the right direction which is the direction opposite to the readout direction in the imaging element 133. Arrangement directions of the imaging elements 131 and 132 are mutually different by 45°. The arrangement directions of the imaging elements 133 and 134 are mutually different by 45°.

In the pixel data of the imaging elements 131 and 132, the pixel regions 632 and 633 are the pixel data to be read out first. The pixel regions 632 and 633 correspond to the image overlapping region 631 in which the photographing angles of view of the imaging elements 131 and 132 overlap each other.

In the pixel data of the imaging elements 133 and 134, the pixel regions 642 and 643 are the pixel data to be read out first. The pixel regions 642 and 643 correspond to the image overlapping region 641 in which the photographing angles of view of the imaging elements 133 and 134 overlap each other.

In the pixel data of the imaging elements 132 and 133, the pixel regions 652 and 653 are pixel data to be read out last. The pixel regions 652 and 653 correspond to the image overlapping region 651 in which the photographing angles of view of the imaging elements 132 and 133 overlap each other.

FIG. 6B illustrates a view illustrating the synthesized images. The image synthesizing unit 156 firstly synthesizes the images of the imaging elements 131 and 132 so that the positions of the image overlapping region 631 which corresponds to the pixel region 632 of the imaging element 131 and the pixel region 633 of the imaging element 132 coincide with each other, and obtains the synthesized image 661 of FIG. 6B. Subsequently, the image synthesizing unit 156 synthesizes the images of the imaging elements 133 and 134 so that the positions of the image overlapping region 641 which corresponds to the pixel region 642 of the imaging element 133 and the pixel region 643 of the imaging element 134 coincide with each other, and obtains the synthesized image 662 of FIG. 6B. After that, the image synthesizing unit 156 synthesizes the synthesized images 661 and 662 so that the positions of the image overlapping region 651 which corresponds to the pixel region 652 of the imaging element 132 and the pixel region 653 of the imaging element 133 coincide with each other, and obtains the synthesized image 663 of FIG. 6B.

Each of the imaging elements 131 to 138 are arranged in such a direction that the imaging elements output from pixel data such as the pixel regions 632, 633, 642, 643 and the like of the image overlapping regions 631, 641 and the like which are necessary for image synthesis among the adjacent imaging elements 131 to 138. In particular, in the case of the imaging elements 131 to 138 of which the readout directions are fixed, the imaging elements 131 to 138 are arranged so that the arrangement directions of every adjacent imaging elements among the imaging elements 131 to 138 stagger. By the arrangement of the imaging elements 131 to 138 in the above described way, output starts from the pixel data of the image overlapping regions 631, 641 and the like, and accordingly the image synthesizing unit 156 can advance the timing of synthesizing processing.

Figure 7:
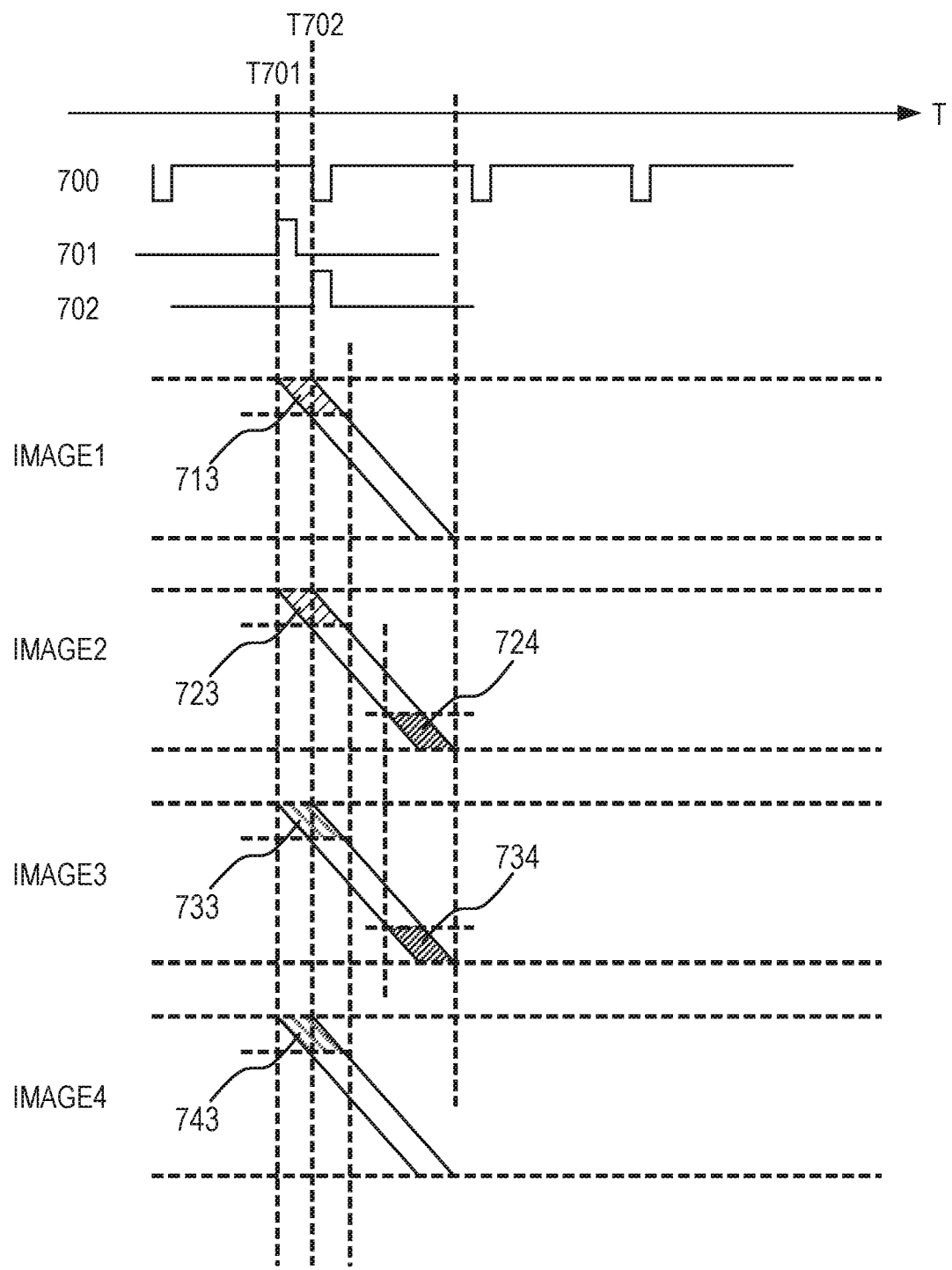
FIG. 7 illustrates a schematic view illustrating a readout operation of the imaging element.

FIG. 7 illustrates a view illustrating a relationship between each of the imaging elements 131 to 134 and the driving signals for driving the imaging elements 131 to 134. The driving signal in FIG. 7 includes a vertical synchronizing signal 700, an electronic shutter signal 701 and a readout signal 702. The image data Image 1 is image data output by the imaging element 131. The image data Image 2 is image data output by the imaging element 132. The image data Image 3 is image data output by the imaging element 133. The image data Image 4 is image data output by the imaging element 134. The case of the imaging elements 131 to 134 will be described below, but also the imaging elements 135 to 138 are similar.

The controlling unit 150 outputs the common vertical synchronizing signal 700 to the imaging elements 131 to 134. Furthermore, the controlling unit 150 outputs the photographing parameters such as exposure time and readout time which are common to each of the imaging elements 131 to 134. Each of the imaging elements 131 to 134 generates an electronic shutter signal 701 and a readout signal 702, based on the vertical synchronizing signal 700 and the photographing parameters which have been output from the controlling unit 150. The electronic shutter signal 701 and the readout signal 702 may be generated in the imaging elements 131 to 134, or the controlling unit 150 may output the signals to the imaging elements 131 to 134.

The imaging elements 131 to 134 generate the electronic shutter signal 701 at the time T701, and generate the readout signal 702 at the time T702, based on the vertical synchronizing signal 700 output from the controlling unit 150. At the time T701, the imaging elements 131 to 134 start light exposure of each pixel line, in response to the electronic shutter signal 701. At the time T702, the imaging elements 131 to 134 start readout for each of the pixel lines, in response to the readout signal 702.

The imaging element 131 first reads out a partial image 713. The partial image 713 corresponds to the pixel region 632 and the image overlapping region 631 in FIG. 6A.

The imaging element 132 first reads out a partial image 723, and finally reads out a partial image 724. The partial image 723 corresponds to the pixel region 633 and the image overlapping region 631 in FIG. 6A. The partial image 724 corresponds to the pixel region 652 and the image overlapping region 651 in FIG. 6A.

The imaging element 133 first reads out a partial image 733, and finally reads out a partial image 734. The partial image 733 corresponds to the pixel region 642 and the image overlapping region 641 in FIG. 6A. The partial image 734 corresponds to the pixel region 653 and the image overlapping region 651 in FIG. 6A.

The imaging element 134 first reads out a partial image 743. The partial image 743 corresponds to the pixel region 643 and the image overlapping region 641 in FIG. 6A.

The partial images 713 and 723 correspond to the image overlapping region 631, and the light exposure and readout are performed at the same timing. The partial images 733 and 743 correspond to the image overlapping region 641, and the light exposure and readout are performed at the same timing. The partial images 724 and 734 correspond to the image overlapping region 651, and the light exposure and readout are performed at the same timing.

By synchronizing the light exposure and readout timings of the imaging elements 131 to 134, the imaging elements 131 to 134 can acquire partial images of the image overlapping regions 631, 641 and 651 at the same timing. In the imaging elements 131 to 134 having a rolling shutter in particular, readout times for each of the image lines are different, and accordingly, due to the change of the arrangement direction of the imaging elements 131 to 134, the exposure times of the image overlapping regions 631, 641 and 651 can coincide with each other or become close to each other.

Especially, when the object is a moving body and the photographing timings of the imaging elements 131 to 134 do not coincide, the positions of the object in the captured images result in being different between the images to be synthesized. Due to the synchronization of the readout timings of the images of the image overlapping regions 631, 641 and 651 of the adjacent imaging elements 131 to 134, the imaging time periods of the moving bodies coincide with each other, and accordingly the load of position alignment can be reduced.

Next, the effect of reducing the load on image processing due to the arrangement direction of the imaging elements 131 to 134 will be described with reference to FIGS. 8A, 8B, 8C and 8D. FIGS. 8A, 8B, 8C and 8D illustrate views illustrating the readout of images from the imaging elements 131 to 134 and the synthesizing processing.

Figure 8A:
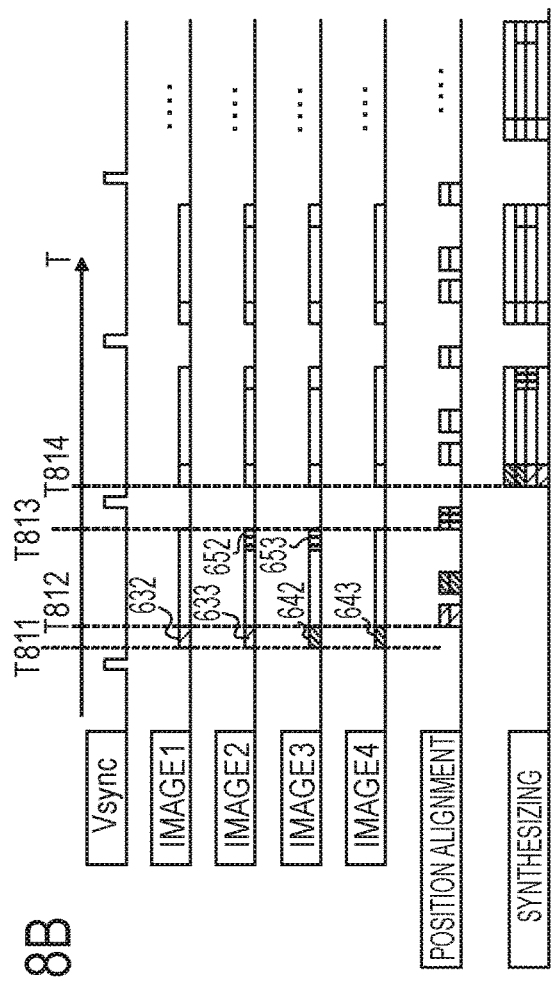
FIGS. 8A, 8B, 8C and 8D illustrate schematic views illustrating the synthesizing processing.
Figure 8B:
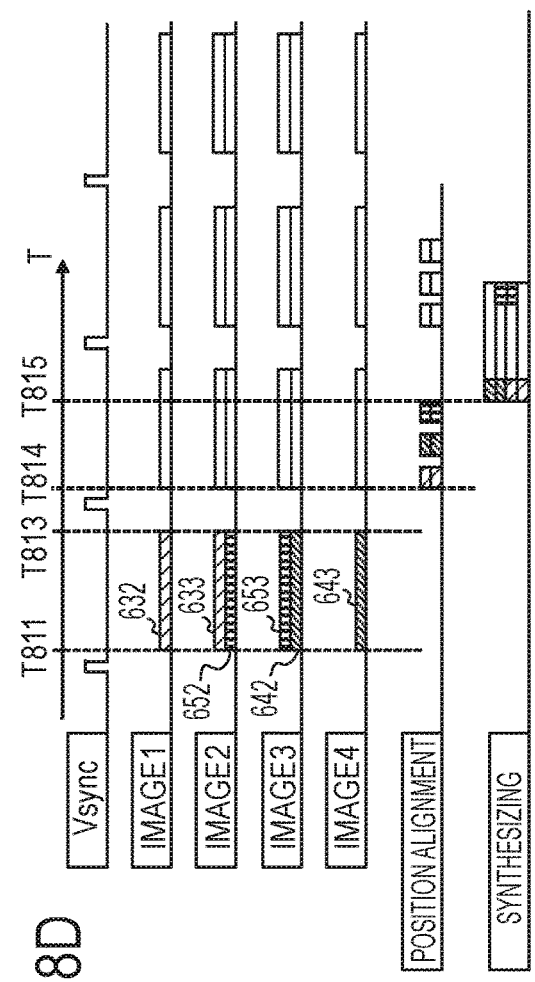

FIG. 8A illustrates a view illustrating arrangement and readout direction of the imaging elements 131 to 134 according to the present embodiment; and FIG. 8B is a timing chart illustrating an operation of the imaging elements 131 to 134 in FIG. 8A. The imaging elements 131 to 134 correspond to the imaging elements 131 to 134 in FIG. 6A, and the readout lines are arranged in a direction extending in each vertical direction.

The imaging element 131 reads out pixels from the right pixel line toward the left pixel line on a line-by-line basis.

In other words, the imaging element 131 starts readout from the pixel line of the pixel region 632.

The imaging element 132 reads out pixels from the left pixel line toward the right pixel line on the line-by-line basis. In other words, the imaging element 132 starts readout from the pixel line of the pixel region 633, and finishes readout at the pixel line of the pixel region 652.

The imaging element 133 reads out pixels from the right pixel line toward the left pixel line on the line-by-line basis. In other words, the imaging element 133 starts readout from the pixel line of the pixel region 642, and finishes readout at the pixel line of the pixel region 653.

The imaging element 134 reads out pixels from the left pixel line toward the right pixel line on the line-by-line basis. In other words, the imaging element 134 starts readout from the pixel line of the pixel region 643.

The pixel regions 632 and 633 correspond to the image overlapping region 631 of the imaging elements 131 and 132. The pixel regions 642 and 643 correspond to the image overlapping region 641 of the imaging elements 133 and 134. The pixel regions 652 and 653 correspond to the image overlapping region 651 of the imaging elements 132 and 133.

The image data Image 1 is image data output by the imaging element 131. The image data Image 2 is image data output by the imaging element 132. The image data Image 3 is image data output by the imaging element 133. The image data Image 4 is image data output by the imaging element 134.

The imaging elements 131 to 134 synchronize with the vertical synchronizing signal Vsync, and start outputs of the first frames of the image data Image 1 to Image 4 at the time T811, respectively. After that, at the time T813, the imaging elements 131 to 134 finish the outputs of the first frames of the image data Image 1 to Image 4, respectively.

The imaging element 131 starts the readout from the pixel line of the pixel region 632, and outputs the first frame of the image data Image 1. The imaging element 132 starts the readout from the pixel line of the pixel region 633, finishes the readout with the pixel line of the pixel region 652, and outputs the first frame of the image data Image 2. The imaging element 133 starts the readout from the pixel line of the pixel region 642, finishes the readout with the pixel line of the pixel region 653, and outputs the first frame of the image data Image 3. The imaging element 134 starts the readout from the pixel line of the pixel region 643, and outputs the first frame of the image data Image 4.

In the times T811 to T812, the imaging elements 131 to 134 output the image data of the pixel regions 632, 633, 642 and 643, respectively. At the time T812, the image selecting unit 154 outputs the image data of the pixel regions 632, 633, 642 and 643 to the synthesizing position adjusting unit 155. The synthesizing position adjusting unit 155 calculates a correction parameter for adjusting the synthesizing position so that the partial image of the pixel region 632 and the partial image of the pixel region 633 overlap each other in the image overlapping region 631. In addition, the synthesizing position adjusting unit 155 also calculates a correction parameter for adjusting the synthesizing position so that the partial image of the pixel region 642 and the partial image of the pixel region 643 overlap each other in the image overlapping region 641.

At the time T813, the imaging elements 132 and 133 complete the outputs of the image data of the pixel regions 652 and 653, respectively. The image selecting unit 154 outputs the image data of the pixel regions 652 and 653 to the synthesizing position adjusting unit 155. The synthesizing position adjusting unit 155 calculates a correction parameter for adjusting the synthesizing position so that the partial image of the pixel region 652 and the partial image of the pixel region 653 overlap each other in the image overlapping region 651.

Next, at the time T814, the image synthesizing unit 156 synthesizes the first frames of the image data Image 1 to Image 4 of the imaging elements 131 to 134, based on the correction parameters calculated by the synthesizing position adjusting unit 155. The compressing and expanding unit 152 compresses the synthesized moving image. The communication controlling unit 170 delivers the compressed moving image to the PC 180 via the network 190.

As described above, the imaging range imaged by the imaging element 131 and the imaging range imaged by the imaging element 132 have an image overlapping region 631 corresponding to a position at which parts of the imaging ranges overlap each other. The imaging range imaged by the imaging element 132 and the imaging range imaged by the imaging element 133 have an image overlapping region 651 corresponding to a position at which parts of the imaging ranges overlap each other. The imaging range imaged by the imaging element 133 and the imaging range imaged by the imaging element 134 have an image overlapping region 641 corresponding to a position at which parts of the imaging ranges overlap each other.

The imaging element 131 outputs the pixel data of the image overlapping region 631 in the captured image prior to pixel data of a non-overlapping region in the captured image. The imaging element 132 outputs the pixel data of the image overlapping region 631 in the captured image prior to the pixel data of the non-overlapping region in the captured image, and outputs the pixel data of the image overlapping region 651 in the captured image posterior to the pixel data of the non-overlapping region in the captured image. The imaging element 133 outputs the pixel data of the image overlapping region 641 in the captured image prior to pixel data of a non-overlapping region in the captured image, and outputs the pixel data of the image overlapping region 651 in the captured image posterior to pixel data of a non-overlapping region in the captured image. The imaging element 134 outputs the pixel data of the image overlapping region 641 in the captured image prior to the pixel data of the non-overlapping region in the captured image.

The synthesizing position adjusting unit 155 adjusts the synthesizing position of the captured image of the imaging element 131 and the captured image of the imaging element 132 so that the image overlapping region 631 in the captured image of the imaging element 131 and the image overlapping region 631 in the captured image of the imaging element 132 overlap each other. At this time, the synthesizing position adjusting unit 155 adjusts the synthesizing position of the captured image of the imaging element 131 and the captured image of the imaging element 132, based on the pixel data of the image overlapping region 631 in the captured image of the imaging element 131 and the pixel data of the image overlapping region 631 in the captured image of the imaging element 132.

In addition, the synthesizing position adjusting unit 155 adjusts the synthesizing position of the captured image of the imaging element 133 and the captured image of the imaging element 134 so that the image overlapping region 641 in the captured image of the imaging element 133 and the image overlapping region 641 in the captured image of the imaging element 134 overlap each other. At this time, the synthesizing position adjusting unit 155 adjusts the synthesizing position of the captured image of the imaging element 133 and the captured image of the imaging element 134 based on the pixel data of the image overlapping region 641 in the captured image of the imaging element 133 and the pixel data of the image overlapping region 641 in the captured image of the imaging element 134.

In addition, the synthesizing position adjusting unit 155 adjusts the synthesizing position of the captured image of the imaging element 132 and the captured image of the imaging element 133 so that the image overlapping region 651 in the captured image of the imaging element 132 and the image overlapping region 651 in the captured image of the imaging element 133 overlap each other. At this time, the synthesizing position adjusting unit 155 adjusts the synthesizing position of the captured image of the imaging element 132 and the captured image of the imaging element 133, based on the pixel data of the image overlapping region 651 in the captured image of the imaging element 132 and the pixel data of the image overlapping region 651 in the captured image of the imaging element 133.

The image synthesizing unit 156 synthesizes the image of the imaging element 131, the image of the imaging element 132, the image of the imaging element 133 and the image of the imaging element 134, of which the synthesizing positions have been adjusted by the synthesizing position adjusting unit 155.

The imaging apparatus 100 according to the present embodiment can start the synthesis of the image data Image 1 to Image 4 in an early stage after the imaging elements 131 to 134 have output the image data Image 1 to Image 4. In order to describe the effect, the arrangement of ordinary imaging elements 131 to 134 is illustrated as a comparative example, in FIGS. 8C and 8D.

Figure 8C:
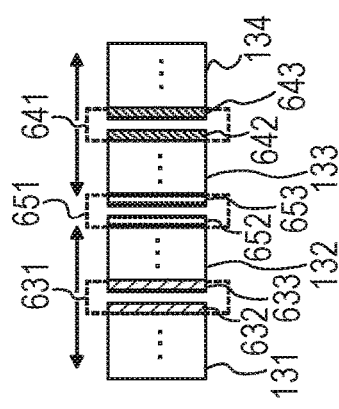
Figure 8D:
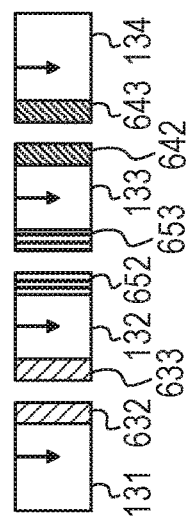

FIG. 8C illustrates a view illustrating an arrangement and readout direction of the ordinary imaging elements 131 to 134; and FIG. 8D is a timing chart showing the operation of the imaging elements 131 to 134 in FIG. 8C. The imaging elements 131 to 134 are arranged in a direction in which the readout lines extend in the horizontal direction. The imaging elements 131 to 134 read out pixels from the upper pixel line toward the lower pixel line on a line-by-line basis.

In the imaging element 131, the right end pixel region in all the pixel lines is the pixel region 632. In the imaging element 132, the left end pixel region in all the pixel lines is the pixel region 633, and the right end pixel region in all the pixel lines is the pixel region 652. In the imaging element 133, the left end pixel region in all the pixel lines is the pixel region 653, and the right end pixel region in all the pixel lines is the pixel region 642. In the imaging element 134, the left end pixel region in all the pixel lines is the pixel region 643.

The pixel regions 632 and 633 correspond to the image overlapping region 631 of the imaging elements 131 and 132. The pixel regions 642 and 643 correspond to the image overlapping region 641 of the imaging elements 133 and 134. The pixel regions 652 and 653 correspond to the image overlapping region 631 of the imaging elements 132 and 133.

The imaging elements 131 to 134 synchronize with the vertical synchronizing signal Vsync, and start outputs of the first frames of the image data Image 1 to Image 4 at the time T811, respectively. After that, at the time T813, the imaging elements 131 to 134 finish the outputs of the first frames of the image data Image 1 to Image 4, respectively.

The imaging element 131 starts readout of the image data of the pixel region 632 at the time T811, and finishes the readout of image data of the pixel region 632 at the time T813. The imaging element 132 starts the readout of the image data of the pixel regions 633 and 652 at the time T811, and finishes the readout of the image data of the pixel regions 633 and 652 at the time T813. The imaging element 133 starts the readout of the image data of the pixel regions 653 and 642 at the time T811, and finishes the readout of the image data of the pixel regions 653 and 642 at the time T813. The imaging element 134 starts the readout of the image data of the pixel region 643 at the time T811, and finishes the readout of the image data of the pixel region 643 at the time T813.

Next, at the time T814, the image selecting unit 154 outputs the image data of the pixel regions 632, 633, 642, 643, 652 and 653 to the synthesizing position adjusting unit 155. The synthesizing position adjusting unit 155 calculates correction parameters for adjusting the synthesizing positions of the pixel regions 632, 633, 642, 643, 652 and 653.

Next, at the time T815, the image synthesizing unit 156 synthesizes the first frames of the image data Image 1 to Image 4 of the imaging elements 131 to 134, based on the correction parameters calculated by the synthesizing position adjusting unit 155.

As described above, the imaging elements 131 to 134 finish outputs of the image data of the pixel regions 632, 633, 652, 653, 642 and 643 at the time T813. Until the finish, the image processing unit 153 cannot start the synthesizing processing of the image data Image 1 to Image 4, and accordingly the start time of the synthesizing processing becomes late.

In contrast to this, as illustrated in FIG. 8B, the imaging elements 131 to 134 according to the present embodiment finish the outputs of the image data of the pixel regions 632, 633, 642 and 643 at the time T812. Because of this, at the time T812, the synthesizing position adjusting unit 155 can start calculation processing for correction parameters for adjusting the synthesizing positions of the image data of the pixel regions 632, 633, 642 and 643. Because of this, at the time T814, the image synthesizing unit 156 can start the synthesizing processing of the image data Image 1 to Image 4, in an early stage. In addition, the synthesizing position adjusting unit 155 adjusts the positions by using only the partial image data of the pixel regions 632, 633, 642, 643, 652 and 653 corresponding to the image overlapping regions 631, 641 and 651, and accordingly can reduce the amount of image data to be processed during position adjustment. In addition, the synthesizing processing unit 153 separates the timing of each of the processing; and can reduce the amount of image data to be processed at one time, decrease a used amount of the memory, and reduce a load in calculation processing.

Second Embodiment

FIGS. 9A, 9B, 9C and 9D illustrate views for describing an imaging apparatus 900 according to a second embodiment of the present invention. The imaging apparatus 900 has imaging units 901 to 904. The imaging apparatus 900 corresponds to the imaging apparatus 100 of the first embodiment. The imaging units 901 to 904 correspond to the imaging units 101 to 104 of the first embodiment. The imaging apparatus 900 has a similar structure to that of the imaging apparatus 100 of the first embodiment, but the arranged positions of the imaging units 901 to 904 are different. Points in which the second embodiment is different from the first embodiment will be described below.

Figure 9A:
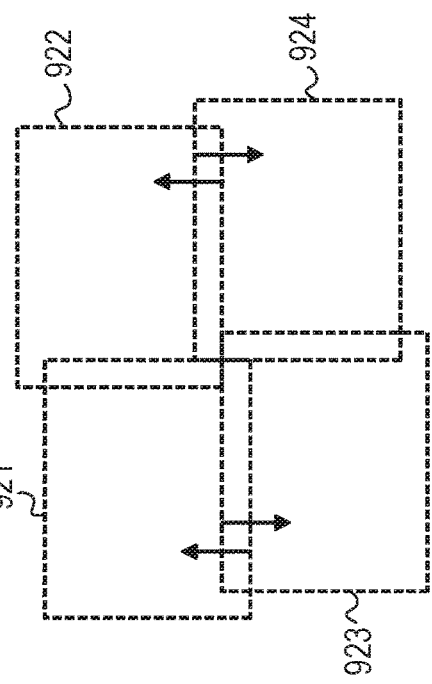
FIGS. 9A, 9B, 9C and 9D illustrate schematic views illustrating an arrangement example of an imaging unit.

FIG. 9A illustrates a view illustrating an arranged position of the imaging unit 901 of the imaging apparatus 900. As one example, the imaging apparatus 900 has four imaging units 901 to 904 on the same plane. Here, the processing of the case will be shown where there are four imaging units 901 to 904 and four image data are synthesized, but the number of the imaging units is not limited to four.

Figure 9B:
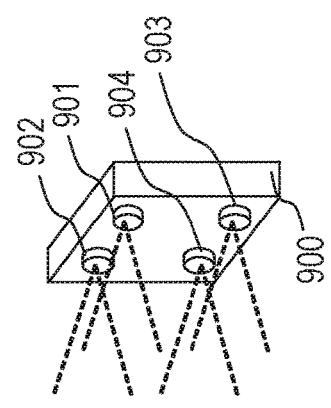

FIG. 9B illustrates a view illustrating a relationship among the photographing angles of view of each of the imaging units 901 to 904 of the imaging apparatus 900 in FIG. 9A. Photographing angles of view 921 to 924 are photographing angles of view of the imaging units 901 to 904, respectively. Each of the imaging units 901 to 904 is arranged so that parts of the photographing angles of view 921 to 924 overlap each other. Arrows in the photographing angles of view 921 to 924 indicate a readout direction of the image data of the respective imaging units 901 to 904.

Figure 9C:
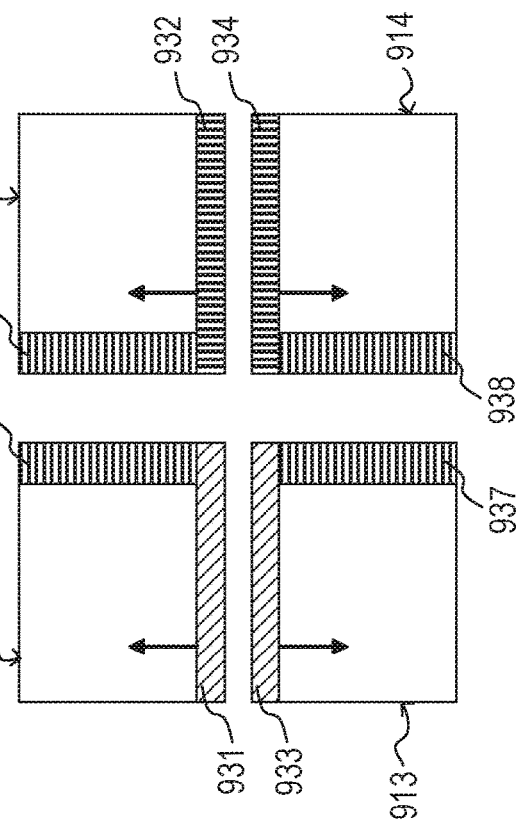

FIG. 9C illustrates a view illustrating the images 911 to 914 imaged by the imaging units 901 to 904. Arrows written in the images 911 to 914 indicate a direction in which the imaging units 901 to 904 read out the images 911 to 914 from the imaging element, respectively. An imaging element of each of the imaging units 901 to 904 is physically arranged so that image data is read out in the direction of the arrow. The imaging elements of the imaging units 901 and 902 are read out from the lower pixel line toward the upper pixel line. The imaging elements of the imaging units 903 and 904 are read out from the upper pixel line toward the lower pixel line.

The image 911 has overlapping regions 931 and 935. The overlapping region 931 is an image region of pixel lines of the lower end in the image 911. The overlapping region 935 is an image region at the right end of all the pixel lines in the image 911.

The image 912 has overlapping regions 932 and 936. The overlapping region 932 is an image region of pixel lines of the lower end in the image 912. The overlapping region 936 is an image region at the left end of all the pixel lines in the image 912.

The image 913 has overlapping regions 933 and 937. The overlapping region 933 is an image region of pixel lines of the upper end in the image 913. The overlapping region 937 is an image region at the right end of all the pixel lines in the image 913.

The image 914 has overlapping regions 934 and 938. The overlapping region 934 is an image region of pixel lines of the upper end in the image 914. The overlapping region 938 is an image region at the left end of all the pixel lines in the image 914.

In the images 911 and 913, the overlapping regions 931 and 933 are image overlapping regions of which the photographing angles of view overlap each other. The overlapping region 931 is an image region of pixel lines which the imaging unit 901 reads out first. The overlapping region 933 is an image region of pixel lines which the imaging unit 903 reads out first.

In addition, in the images 912 and 914, the overlapping regions 932 and 934 are image overlapping regions of which the photographing angles of view overlap each other. The overlapping region 932 is an image region of pixel lines which the imaging unit 902 reads out first. The overlapping region 934 is an image region of pixel lines which the imaging unit 904 reads out first.

In addition, in the images 911 and 912, the overlapping regions 935 and 936 are image overlapping regions of which the photographing angles of view overlap each other. In addition, in the images 913 and 914, the overlapping regions 937 and 938 are image overlapping regions of which the photographing angles of view overlap each other.

The image selecting unit 154, when having detected the completion of the readout of the overlapping regions 931 to 934, outputs the image data of the overlapping regions 931 to 934 to the synthesizing position adjusting unit 155. The synthesizing position adjusting unit 155 calculates a correction parameter for synthesizing the images of the overlapping regions 931 and 933, and calculates a correction parameter for synthesizing the images of the overlapping regions 932 and 934.

After that, the image selecting unit 154, when having detected the completion of the readout of the overlapping regions 935 to 938, outputs the image data of the overlapping regions 935 to 938 to the synthesizing position adjusting unit 155. The synthesizing position adjusting unit 155 calculates a correction parameter for synthesizing the images of the overlapping regions 935 and 936, and calculates a correction parameter for synthesizing the images of the overlapping regions 937 and 938.

Figure 9D:
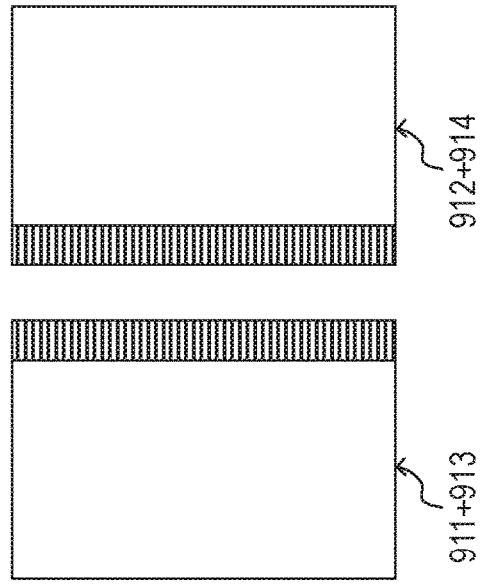

FIG. 9D illustrates a view for illustrating an image synthesis. The image synthesizing unit 156 synthesizes the images 911 and 913, based on the correction parameter to obtain a synthesized image 911+913. Subsequently, the image synthesizing unit 156 synthesizes the images 912 and 914, based on the correction parameter to obtain a synthesized image 912+914. After that, the image synthesizing unit 156 synthesizes the synthesized image 911+913 and the synthesized image 912+914.

As described above, the images 911 and 913 have the respective overlapping regions 931 and 933 at which parts of the imaging ranges overlap each other. The images 912 and 914 have the respective overlapping regions 932 and 934 at which parts of the imaging ranges overlap each other. The images 911 and 912 have the respective overlapping regions 935 and 936 at which the other parts of the imaging ranges overlap each other. The images 913 and 914 have the respective overlapping regions 937 and 938 at which the other parts of the imaging ranges overlap each other.

The imaging element of the imaging unit 901 outputs pixel data of the overlapping region 931 in the image 911 prior to pixel data of a non-overlapping region in the image 911. The imaging element of the imaging unit 902 outputs pixel data of the overlapping region 932 in the image 912 prior to pixel data of a non-overlapping region in the image 912. The imaging element of the imaging unit 903 outputs pixel data of the overlapping region 933 in the image 913 prior to pixel data of a non-overlapping region in the image 913. The imaging element of the imaging unit 904 outputs pixel data of the overlapping region 934 in the image 914 prior to pixel data of a non-overlapping region in the image 914.

The synthesizing position adjusting unit 155 adjusts the synthesizing position of the image 911 and the image 913 so that the overlapping region 931 and the overlapping region 933 overlap each other, based on the pixel data of the overlapping region 931 in the image 911 and the pixel data of the overlapping region 933 in the image 913.

In addition, the synthesizing position adjusting unit 155 adjusts the synthesizing position of the image 912 and the image 914 so that the overlapping region 932 and the overlapping region 934 overlap each other, based on the pixel data of the overlapping region 932 in the image 912 and the pixel data of the overlapping region 934 in the image 914.

In addition, the synthesizing position adjusting unit 155 adjusts the synthesizing position of the image 911 and the image 912 so that the overlapping region 935 and the overlapping region 936 overlap each other, based on the pixel data of the overlapping region 935 in the image 911 and the pixel data of the overlapping region 936 in the image 912.

In addition, the synthesizing position adjusting unit 155 adjusts the synthesizing position of the image 913 and the image 914 so that the overlapping region 937 and the overlapping region 938 overlap each other, based on the pixel data of the overlapping region 937 in the image 913 and the pixel data of the overlapping region 938 in the image 914.

The image synthesizing unit 156 synthesizes the image 911, the image 912, the image 913 and the image 914 of which the synthesizing positions have been adjusted by the synthesizing position adjusting unit 155.

As described above, the imaging units 901 to 904 start outputs from the pixel data of the overlapping regions 931 to 934, respectively. Thereby, the synthesizing processing unit 153 can start synthesizing processing in an early stage. In addition, the synthesizing processing unit 153 separates the timing of each of the processing; and thereby can reduce the amount of pixel data to be processed at one time, and reduce a load in calculation processing. Furthermore, the controlling unit 150 synchronizes the exposure time and readout timing of the pixel data of the imaging element of each of the imaging units 901 to 904, and thereby can make the exposure time of the image overlapping regions coincide or become close to each other.

Third Embodiment

Figure 10B:
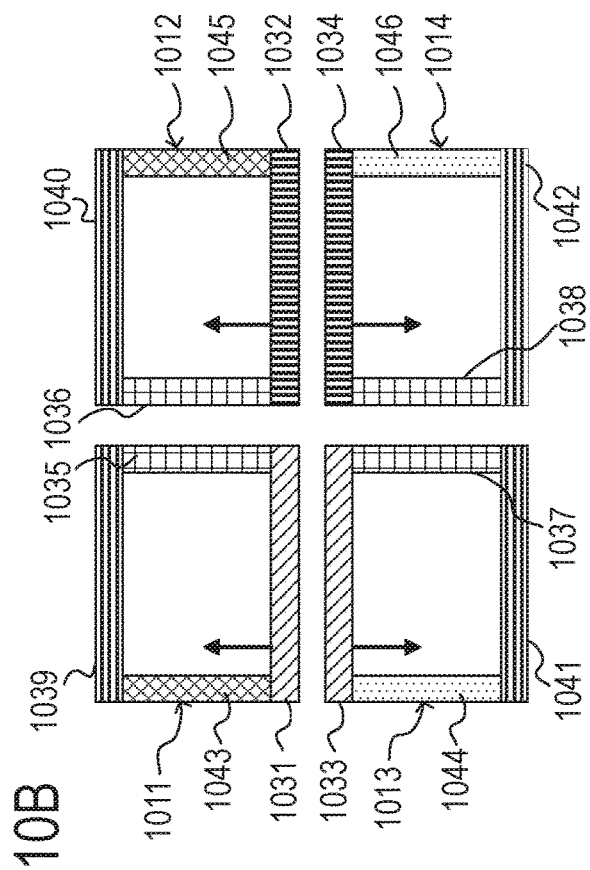
FIGS. 10A, 10B, 10C and 10D illustrate schematic views illustrating an arrangement example of an imaging unit.
Figure 10D:
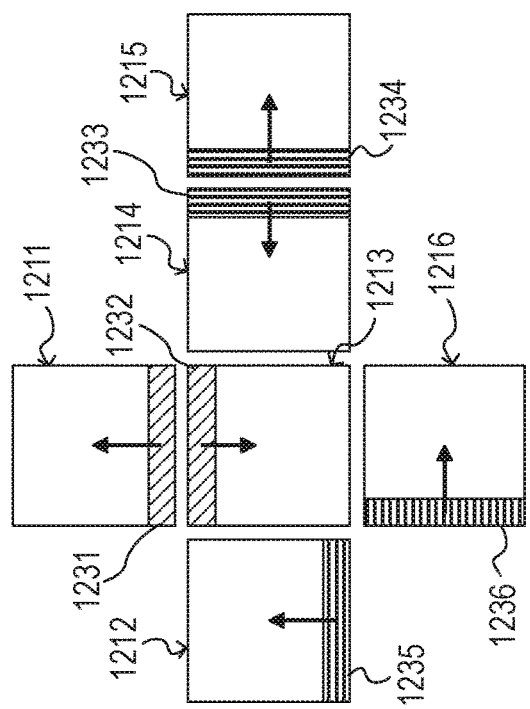
Figure 10A:
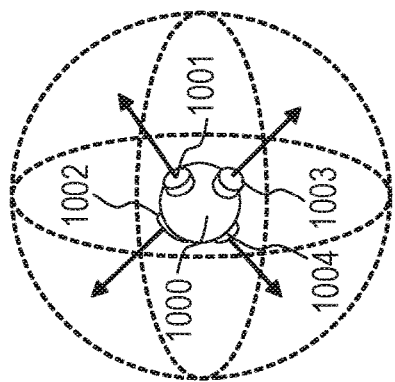

FIGS. 10A and 10B illustrate views for describing an imaging apparatus 1000 according to a third embodiment of the present invention. FIG. 10A illustrates a view illustrating the arrangement of the imaging units 1001 to 1004 of the imaging apparatus 1000. The imaging apparatus 1000 has four imaging units 1001 to 1004, and can synthesize the whole image of the celestial sphere. The imaging apparatus 1000 corresponds to the imaging apparatus 100 of the first embodiment. The imaging units 1001 to 1004 correspond to the imaging units 101 to 104 according to the first embodiment. The imaging apparatus 1000 has a similar structure to that of the imaging apparatus 100 of the first embodiment, but the arranged positions of the imaging units 1001 to 1004 are different. Points in which the third embodiment is different from the first embodiment will be described below.

The imaging apparatus 1000 synthesizes images imaged by the four imaging units 1001 to 1004, and generates the whole image of the celestial sphere. Arrows in the imaging units 1001 to 1004 indicate an optical axis direction of the imaging units 1001 to 1004, respectively. Each of the imaging units 1001 to 1004 is arranged so that parts of the photographing angles of view overlap each other.

FIG. 10B illustrates a view illustrating images 1011 to 1014 of the imaging units 1001 to 1004. The images 1011 to 1014 are images imaged by the imaging units 1001 to 1004, respectively. Arrows in the images 1011 to 1014 indicate directions in which imaging elements of the respective imaging units 1001 to 1004 read out the images 1011 to 1014, respectively. The imaging elements of the respective imaging units 1001 to 1004 are physically arranged so as to start readout from the pixel data of the image overlapping regions according to the directions of the arrows. When the imaging units 1001 to 1004 have completed the readout of the pixel data of the image overlapping regions, the synthesizing position adjusting unit 155 calculates correction parameters for adjusting the synthesizing positions. The image synthesizing unit 156 synthesizes the images 1011 to 1014, based on the correction parameters.

The images 1011 and 1013 have the respective overlapping regions 1031 and 1033 at which parts of the imaging ranges overlap each other. Images 1012 and 1014 have the respective overlapping regions 1032 and 1034 at which parts of the imaging ranges overlap each other. The images 1011 and 1012 have the overlapping regions 1035 and 1036 at which parts of the imaging ranges overlap each other, the overlapping regions 1043 and 1045 at which other parts of the imaging ranges overlap each other, and the overlapping regions 1039 and 1040 at which other parts of the imaging ranges overlap each other, respectively. The images 1013 and 1014 have the overlapping regions 1037 and 1038 at which parts of the imaging ranges overlap each other, the overlapping regions 1044 and 1046 at which other parts of the imaging ranges overlap each other, and the overlapping regions 1041 and 1042 at which other parts of the imaging ranges overlap each other, respectively.

The imaging element of the imaging unit 1001 outputs pixel data of the overlapping region 1031 in the image 1011 prior to pixel data of a non-overlapping region in the image 1011, and outputs pixel data of the overlapping region 1039 in the image 1011 posterior to the pixel data of the non-overlapping region in the image 1011. The imaging element of the imaging unit 1002 outputs pixel data of the overlapping region 1032 in the image 1012 prior to pixel data of a non-overlapping region in the image 1012, and outputs the pixel data of the overlapping region 1040 in the image 1012 posterior to the pixel data of the non-overlapping region in the image 1012. The imaging element of the imaging unit 1003 outputs pixel data of the overlapping region 1033 in the image 1013 prior to pixel data of a non-overlapping region in the image 1013, and outputs the pixel data of the overlapping region 1041 in the image 1013 posterior to the pixel data of the non-overlapping region in the image 1013. The imaging element of the imaging unit 1004 outputs pixel data of the overlapping region 1034 in the image 1014 prior to pixel data of a non-overlapping region in the image 1014, and outputs the pixel data of the overlapping region 1042 in the image 1014 posterior to the pixel data of the non-overlapping region in the image 1014.

The synthesizing position adjusting unit 155 adjusts the synthesizing position of the image 1011 and the image 1013 so that the overlapping region 1031 and the overlapping region 1033 overlap each other, based on the pixel data of the overlapping region 1031 in the image 1011 and the pixel data of the overlapping region 1033 in the image 1013.

In addition, the synthesizing position adjusting unit 155 adjusts the synthesizing position of the image 1012 and the image 1014 so that the overlapping region 1032 and the overlapping region 1034 overlap each other, based on the pixel data of the overlapping region 1032 in the image 1012 and the pixel data of the overlapping region 1034 in the image 1014.

In addition, the synthesizing position adjusting unit 155 adjusts the synthesizing position of the image 1011 and the image 1012 so that the overlapping region 1035 and the overlapping region 1036 overlap each other and the overlapping region 1043 and the overlapping region 1045 overlap each other.

In addition, the synthesizing position adjusting unit 155 adjusts the synthesizing position of the image 1013 and the image 1014 so that the overlapping region 1037 and the overlapping region 1038 overlap each other and the overlapping region 1044 and the overlapping region 1046 overlap each other.

In addition, the synthesizing position adjusting unit 155 adjusts the synthesizing position of the image 1011 and the image 1013 so that the overlapping region 1039 and the overlapping region 1041 overlap each other. In addition, the synthesizing position adjusting unit 155 adjusts the synthesizing position of the image 1012 and the image 1014 so that the overlapping region 1040 and the overlapping region 1042 overlap each other.

The image synthesizing unit 156 synthesizes the image 1011, the image 1012, the image 1013 and the image 1014 of which the synthesizing positions have been adjusted by the synthesizing position adjusting unit 155.

Fourth Embodiment

Figure 10C:
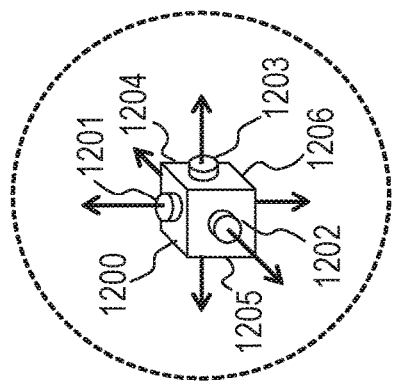

FIGS. 10C and 10D illustrate views for describing an imaging apparatus 1200 according to a fourth embodiment of the present invention. FIG. 10C illustrates a view illustrating the arrangement of the imaging units 1201 to 1206 of the imaging apparatus 1200. The imaging apparatus 1200 has six imaging units 1201 to 1206, and can synthesize the whole image of the celestial sphere. The imaging apparatus 1200 corresponds to the imaging apparatus 100 of the first embodiment. The imaging units 1201 to 1206 correspond to the imaging units 101 to 106 according to the first embodiment. The imaging apparatus 1200 has a similar structure to that of the imaging apparatus 100 of the first embodiment, but the arranged positions of the imaging units 1201 to 1206 are different. The points will be described below in which the present embodiment is different from the first embodiment.

The imaging apparatus 1200 synthesizes images imaged by the six imaging units 1201 to 1206, and generates the whole image of the celestial sphere. Arrows of the imaging units 1201 to 1206 indicate optical axis directions of the imaging units 1201 to 1206, respectively. Each of the imaging units 1201 to 1206 is arranged so that parts of the photographing angles of view overlap each other.

FIG. 10D illustrates a view illustrating images 1211 to 1216 of the respective imaging units 1201 to 1206. The images 1211 to 1216 are images imaged by the imaging units 1201 to 1206, respectively. Arrows in the images 1211 to 1216 indicate directions in which imaging elements of the respective imaging units 1201 to 1206 read out the images 1211 to 1216, respectively. The imaging elements of the respective imaging units 1201 to 1206 are physically arranged so as to start readout from the pixel data of the image overlapping regions according to the directions of the arrows. When the imaging units 1201 to 1206 have completed the readout of the pixel data of the image overlapping regions, the synthesizing position adjusting unit 155 calculates correction parameters for adjusting the synthesizing positions. The image synthesizing unit 156 synthesizes the images 1211 to 1216, based on the correction parameters. The synthesizing processing unit 153 can distribute the load of synthesizing processing, by dividing combinations of pixel data of which the synthesizing positions are to be adjusted.

The images 1211 and 1213 have the respective overlapping regions 1231 and 1032 at which parts of the imaging ranges overlap each other. Images 1214 and 1215 have the respective overlapping regions 1233 and 1034 at which parts of the imaging ranges overlap each other. Images 1212 and 1216 have the respective overlapping regions 1235 and 1036 at which parts of the imaging ranges overlap each other.

The imaging element of the imaging unit 1201 outputs pixel data of the overlapping region 1231 in the image 1211 prior to pixel data of a non-overlapping region in the image 1211. The imaging element of the imaging unit 1202 outputs pixel data of the overlapping region 1235 in the image 1212 prior to pixel data of a non-overlapping region in the image 1212. The imaging element of the imaging unit 1203 outputs pixel data of the overlapping region 1232 in the image 1213 prior to pixel data of a non-overlapping region in the image 1213. The imaging element of the imaging unit 1204 outputs pixel data of the overlapping region 1233 in the image 1214 prior to pixel data of a non-overlapping region in the image 1214. The imaging element of the imaging unit 1205 outputs pixel data of the overlapping region 1234 in the image 1215 prior to pixel data of a non-overlapping region in the image 1215. The imaging element of the imaging unit 1206 outputs pixel data of the overlapping region 1236 in the image 1216 prior to pixel data of a non-overlapping region in the image 1216.

The synthesizing position adjusting unit 155 adjusts the synthesizing position of the image 1211 and the image 1213 so that the overlapping region 1231 and the overlapping region 1232 overlap each other, based on the pixel data of the overlapping region 1031 in the image 1211 and the pixel data of the overlapping region 1232 in the image 1013. In addition, the synthesizing position adjusting unit 155 adjusts the synthesizing position of the image 1214 and the image 1215 so that the overlapping region 1233 and the overlapping region 1234 overlap each other, based on the pixel data of the overlapping region 1033 in the image 1214 and the pixel data of the overlapping region 1234 in the image 1215. In addition, the synthesizing position adjusting unit 155 adjusts the synthesizing position of the image 1212 and the image 1216 so that the overlapping region 1235 and the overlapping region 1236 overlap each other, based on the pixel data of the overlapping region 1035 in the image 1212 and the pixel data of the overlapping region 1236 in the image 1216.

The image synthesizing unit 156 synthesizes the image 1211, the image 1212, the image 1213, the image 1214, the image 1215 and the image 1216 of which the synthesizing positions have been adjusted by the synthesizing position adjusting unit 155.

As described above, the imaging unit starts output from the pixel data of the image overlapping regions. Thereby, the synthesizing processing unit 153 can start synthesizing processing in an early stage. In addition, the synthesizing processing unit 153 separates the timing of each of the processing; and thereby can reduce the amount of pixel data to be processed at one time, and reduce a load in calculation processing.

Up to this point, the present invention has been described in detail based on the exemplary embodiments, but the present invention is not limited to these particular embodiments, and various forms are also included in such a range as not to deviate from the scope of the invention. Parts of the above described embodiments may be appropriately combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-025185, filed Feb. 15, 2018, which is hereby incorporated by reference herein in its entirety.

What is claimed is:

1. An imaging apparatus comprising:
a first imaging element configured to image a first imaging range;
a second imaging element configured to image a second imaging range; and
a synthesizing unit configured to synthesizes an image corresponding to a third imaging range wider than the first imaging range or the second imaging range based on pixel data groups output by the first imaging element and the second imaging element, wherein
the first imaging element and the second imaging element output pixel data corresponding to a position at which the first imaging range and the second imaging range overlap with each other, to the synthesizing unit prior to other pixel data,
the first imaging element has pixels in a matrix form and reads out pixels on a line-by-line basis in the first direction, and
the second imaging element has pixels in a matrix form, and reads out pixels on the line-by-line basis in a second direction which is opposite to the first direction.

2. The imaging apparatus according to claim 1, wherein the synthesizing unit is further configured to adjust a synthesizing position, based on the pixel data corresponding the position at which the first imaging range and the second imaging range overlap each other, the synthesizing unit acquiring the pixel data from the first imaging element and the second imaging element at the position.

3. The imaging apparatus according to claim 1, further comprising a third imaging element that images a third imaging range of which one part overlaps with the second imaging range, wherein
the second imaging element outputs pixel data corresponding to a position at which the second imaging range and the third imaging range overlap each other, to the synthesizing unit posterior to other pixel data, and
the synthesizing unit synthesizes an image corresponding to an imaging range wider than the first imaging range, the second imaging range or the third imaging range, based on pixel data groups output by the first imaging element, the second imaging element and the third imaging element.

4. The imaging apparatus according to claim 3, further comprising a fourth imaging element that images a fourth imaging range of which one part overlaps with the third imaging range, wherein
the third imaging element outputs pixel data corresponding to a position at which the third imaging range and the fourth imaging range overlap each other, to the synthesizing unit prior to other pixel data, and outputs pixel data corresponding to a position at which the second imaging range and the third imaging range overlap each other, to the synthesizing unit posterior to other pixel data;
the fourth imaging element outputs pixel data corresponding to a position at which the third imaging range and the fourth imaging range overlap each other, to the synthesizing unit prior to other pixel data; and
the synthesizing unit synthesizes an image corresponding to an imaging range wider than the first imaging range, the second imaging range, the third imaging range or the fourth imaging range, based on pixel data groups output by the first imaging element, the second imaging element, the third imaging element and the fourth imaging element.

5. The imaging apparatus according to claim 1, further comprising:
a third imaging element that images a third imaging range of which one part overlaps with the first imaging range, and
a fourth imaging element that images a fourth imaging range of which one part overlaps with the third imaging range and of which one part overlaps with the second imaging range, wherein
the third imaging element outputs pixel data corresponding to a position at which the third imaging range and the fourth imaging range overlap each other, to the synthesizing unit prior to other pixel data;
the fourth imaging element outputs pixel data corresponding to a position at which the third imaging range and the fourth imaging range overlap each other, to the synthesizing unit prior to other pixel data; and
the synthesizing unit synthesizes an image corresponding to an imaging range wider than the first imaging range, the second imaging range, the third imaging range or the fourth imaging range, based on pixel data groups output by the first imaging element, the second imaging element, the third imaging element and the fourth imaging element.

6. The imaging apparatus according to claim 1, further comprising:
a third imaging element that images a third imaging range of which one part overlaps with the first imaging range, and
a fourth imaging element that images a fourth imaging range of which one part overlaps with the second imaging range and of which one part overlaps with the third imaging range, wherein
the first imaging element outputs pixel data corresponding to a position at which the first imaging range and the third imaging range overlap each other, to the synthesizing unit posterior to other pixel data;

the second imaging element outputs pixel data corresponding to a position at which the second imaging range and the fourth imaging range overlap each other, to the synthesizing unit posterior to other pixel data;

the third imaging element outputs pixel data corresponding to a position at which the third imaging range and the fourth imaging range overlap each other, to the synthesizing unit prior to other pixel data, and outputs pixel data corresponding to a position at which the first imaging range and the third imaging range overlap each other, to the synthesizing unit posterior to other pixel data;

the fourth imaging element outputs pixel data corresponding to a position at which the third imaging range and the fourth imaging range overlap each other, to the synthesizing unit prior to other pixel data, and outputs pixel data corresponding to a position at which the second imaging range and the fourth imaging range overlap each other, to the synthesizing unit posterior to other pixel data; and the synthesizing unit synthesizes an image corresponding to an imaging range wider than the first imaging range, the second imaging range, the third imaging range or the fourth imaging range, based on pixel data groups output by the first imaging element, the second imaging element, the third imaging element and the fourth imaging element.

7. The imaging apparatus according to claim 1, further comprising:

a third imaging element that images a third imaging range, a fourth imaging element that images a fourth imaging range of which one part overlaps with the third imaging range, a fifth imaging element that images a fifth imaging range, and a sixth imaging element that images a sixth imaging range of which one part overlaps with the fifth imaging range, wherein the synthesizing unit synthesizes an image corresponding to an imaging range wider than the first imaging range, the second imaging range, the third imaging range, the fourth imaging range, the fifth imaging range or the sixth imaging range, based on pixel data groups output by the first imaging element, the second imaging element, the third imaging element, the fourth imaging element, the fifth imaging element and the sixth imaging element.

8. A method for controlling an imaging apparatus having a first imaging element that images a first imaging range, and a second imaging element that images a second imaging range of which one part overlaps with the first imaging range, comprising:

the first imaging element and the second imaging element outputting pixel data corresponding to a position at which the first imaging range and the second imaging range overlap each other, prior to other pixel data; and synthesizing an image corresponding to an imaging range wider than the first imaging range or the second imaging range, based on pixel data groups output by the first imaging element and the second imaging element, the first imaging element has pixels in a matrix form and reads out pixels on a line-by-line basis in the first direction, and the second imaging element has pixels in a matrix form, and reads out pixels on the line-by-line basis in a second direction which is opposite to the first direction.

9. An imaging apparatus comprising:

a first imaging element configured to image a first imaging range;

a second imaging element configured to image a second imaging range;

a third imaging element that images a third imaging range of which one part overlaps with the second imaging range, and a synthesizing unit configured to synthesizes an image corresponding to an imaging range wider than the first imaging range, the second imaging range or the third imaging range, based on pixel data groups output by the first imaging element, the second imaging element and the third imaging element, wherein the first imaging element and the second imaging element output pixel data corresponding to a position at which the first imaging range and the second imaging range overlap with each other, to the synthesizing unit prior to other pixel data, and the second imaging element outputs pixel data corresponding to a position at which the second imaging range and the third imaging range overlap each other, to the synthesizing unit posterior to other pixel data.

* * * * *